US006830676B2

(12) United States Patent  
Deevi

(10) Patent No.: US 6,830,676 B2
(45) Date of Patent: Dec. 14, 2004

(54) COKING AND CARBURIZATION RESISTANT IRON ALUMINIDES FOR HYDROCARBON CRACKING

(75) Inventor: Seetharama C. Deevi, Midlothian, VA (US)

(73) Assignee: Chrysalis Technologies Incorporated, Richmond, VA (US)

( * ) Notice: Subject to any disclaimer, the term of this patent is extended or adjusted under 35 U.S.C. 154(b) by 448 days.

(21) Appl. No.: 09/876,917

(22) Filed: Jun. 11, 2001

(65) Prior Publication Data

US 2002/0187091 A1 Dec. 12, 2002

(51) Int. Cl.[7] .............................. C10G 9/16; C10G 9/14; C07C 4/04; F28D 7/00; C22C 38/06
(52) U.S. Cl. ..................... 208/48 R; 208/132; 585/648; 585/649; 585/650; 585/920; 422/200; 422/201; 420/77; 420/79; 420/81
(58) Field of Search ............................. 208/48 R, 132; 585/648, 649, 650, 920; 422/200, 201; 420/77, 79, 81

(56) References Cited

U.S. PATENT DOCUMENTS

| | | | |
|---|---|---|---|
| 1,990,650 A | * | 2/1935 | Jaeger ......................... 420/79 |
| 4,343,658 A | | 8/1982 | Baker et al. |
| 4,410,418 A | | 10/1983 | Kukes et al. |
| 4,507,196 A | | 3/1985 | Reed et al. |
| 4,692,313 A | | 9/1987 | Watanabe et al. |
| 4,762,681 A | | 8/1988 | Tassen et al. |
| 4,961,903 A | * | 10/1990 | McKamey et al. ........... 420/79 |
| 4,976,932 A | | 12/1990 | Maeda et al. |
| 4,991,440 A | | 2/1991 | Pleinis et al. |
| 5,277,936 A | * | 1/1994 | Olson et al. ................. 427/453 |
| 5,316,721 A | | 5/1994 | Sugitani et al. |
| 5,446,229 A | | 8/1995 | Taylor et al. |
| 5,616,236 A | | 4/1997 | Brown et al. |
| 5,620,651 A | | 4/1997 | Sikka et al. |
| 5,626,726 A | | 5/1997 | Kong |
| 5,658,452 A | | 8/1997 | Heyse et al. |
| 5,676,821 A | | 10/1997 | Heyse et al. |
| 5,833,838 A | | 11/1998 | Heyse et al. |
| 5,950,718 A | | 9/1999 | Sugitani et al. |
| 5,976,458 A | | 11/1999 | Sikka et al. |
| 6,030,472 A | | 2/2000 | Hajaligol et al. |
| 6,033,623 A | | 3/2000 | Deevi et al. |
| 6,093,454 A | * | 7/2000 | Brindley et al. ............ 427/456 |
| 6,329,079 B1 | * | 12/2001 | Meyer ......................... 428/679 |
| 6,475,647 B1 | * | 11/2002 | Mendez Acevedo et al. ........................... 428/678 |
| 6,585,864 B1 | * | 7/2003 | Fisher et al. ............ 204/192.16 |
| 2002/0192494 A1 | * | 12/2002 | Tzatzov et al. ............. 428/655 |

FOREIGN PATENT DOCUMENTS

| | | |
|---|---|---|
| GB | 1149163 | 4/1969 |
| GB | 1604604 | 12/1981 |

* cited by examiner

Primary Examiner—Walter D. Griffin  
(74) Attorney, Agent, or Firm—Burns, Doane, Swecker & Mathis, LLP

(57) ABSTRACT

A cracking tube includes a lining of a fouling resistant and corrosion resistant iron aluminide alloy. The iron aluminide alloy can include 14–32 wt. % Al, at least 2 vol. % transition metal oxides, 0.003 to 0.020 wt. % B, 0.2 to 2.0 wt. % Mo, 0.05 to 1.0 wt. % Zr, 0.2 to 2.0 wt. % Ti, 0.10 to 1.0 wt. % La, 0.05 to 0.2 wt. % C., balance Fe, and optionally $\leq 1$ wt. % Cr, and the coefficient of thermal expansion of the iron aluminide alloy is substantially the same as the coefficient of thermal expansion over the temperature range of ambient to about 1200° C. of an outer metal layer. A cracking tube utilizing the iron aluminide alloy can be formed from powders of the iron aluminide alloy by consolidation methods including cold isostatic pressing (CIP), hot isostatic pressing (HIP), reaction synthesis, spraying techniques, or co-extrusion with a second material of the cracking tube.

28 Claims, 2 Drawing Sheets

COKING AND CARBURIZATION RESISTANT IRON ALUMINIDES FOR HYDROCARBON CRACKING

BACKGROUND

1. Field of the Invention

Figure 1:
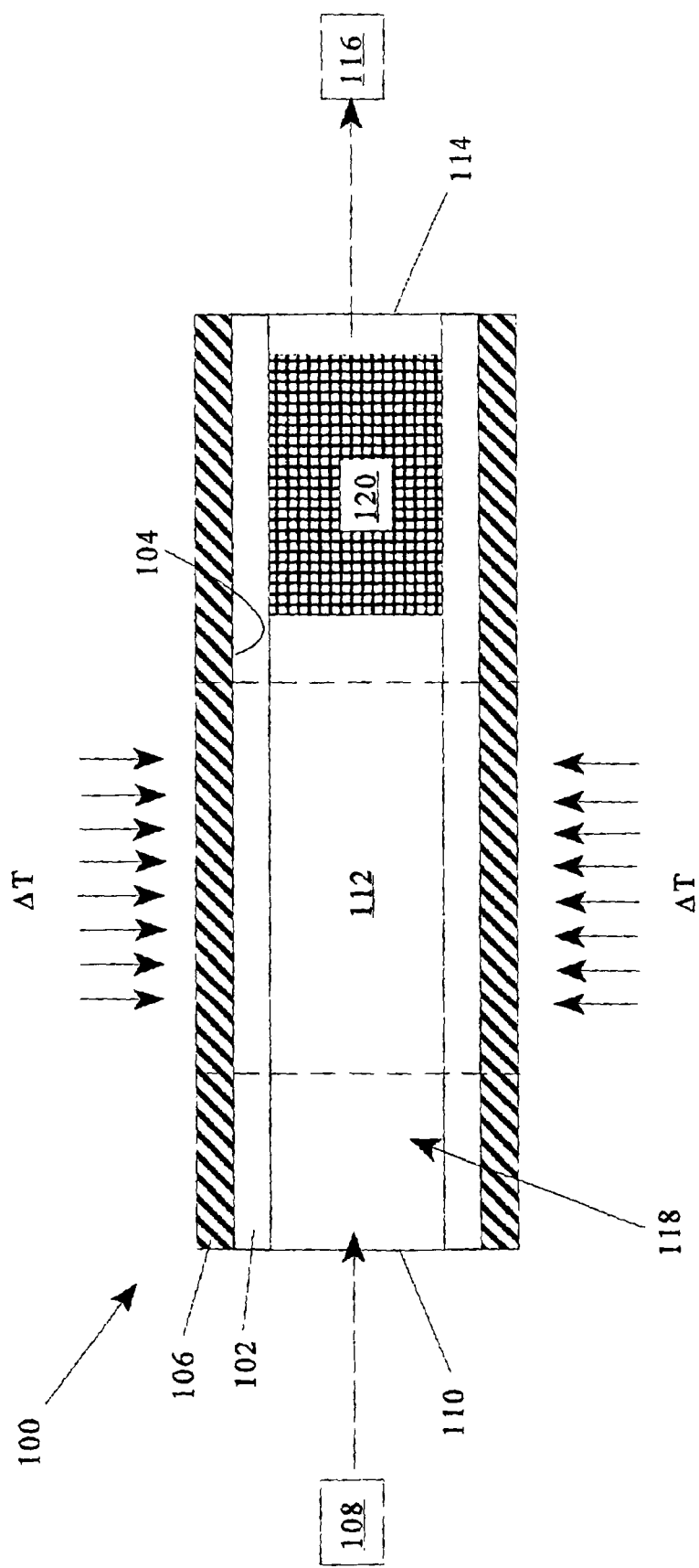

The present invention is directed generally to apparatus for producing chemical products. More specifically, the present invention is directed to tubular products for cracking of hydrocarbon feedstock.

2. Background Information

Chemical reactions can be performed by flowing reagents along a tube maintained at high temperature and disposed inside a radiation zone of a furnace. More particularly, methods such as "steam pyrolysis" or "steam cracking" are known in which a diluent fluid such as steam is usually combined with a hydrocarbon feed and introduced into a cracking tube of a cracking furnace. Within the cracking furnace, the feedstock is converted to a gaseous mixture, which upon exiting the cracking furnace is cooled to remove most of the heavier gases and is compressed. The compressed mixture is routed through various distillation columns where the individual components such as ethylene are purified and separated. For example, in ethylene production, naphtha, ethane, butane or like starting material and steam are charged into a cracking tube as feedstock and radiantly heated from the outside to a high temperature in excess of 1000° C. to crack the material within the cracking tube.

One recognized problem in thermal cracking is the formation of coke that can foul the cracking tube. Coking is a surface phenomenon and is generally observed with iron and nickel-based alloys containing chromium in the range of 10 to 25 wt. %. Because coke is a poor thermal conductor, as coke is deposited in the cracking tube, higher furnace temperatures are required to maintain the gas temperature in the cracking zone at necessary levels. Higher temperatures can increase feed consumption and shorten cracking tube life. Additionally, coking can result in an excessive pressure drop across the cracking tube thereby adversely affecting cracking tube performance.

Under such conditions, it is necessary to stop the reaction on a regular basis in order to remove the deposits of by-products. In the particular case of a steam cracking reaction, such removal is performed by a decoking operation on the cracking tube, such as steam decoking and steam-air decoking. This operation consists in causing a mixture of air and steam to flow inside the cracking tube at a temperature that is sufficiently high to burn off and remove the coke. In practice, it is observed that a decoking operation takes a relatively long period of time, the total time required can approach a minimum of 48 hours, and that it is nevertheless desirable to decoke a tube at a high frequency, usually close to once every two or three months, and that such decoking operations result in a significant loss of production.

Another problem recognized in thermal cracking operations is carburization. Carburization results in the formation of carbides in the metal matrix or in grain boundaries of metallic components from exposure to a carbon containing atmosphere. Carburization is severe with alloys such as HP steels, INCO 803, and other materials that contain significant amounts of chromium and nickel with very little aluminum content in the alloy.

Carbides can embrittle steel walls in the cracking tube and the reaction system leading to metallurgical failure. In service, carburization can result in the loss of mechanical properties over time. Carburization can have an influence on the corrosion behavior as well, as carbon can react with chromium and locally deplete the metal matrix of chromium, making it more sensitive to corrosion. Since conventional cracking tubes have very little aluminum content, no diffusional resistance due to aluminum oxide ($Al_2O_3$) exists at the operating temperatures leading to carburization failure. However, because coking can lead to increased pressure in the tube and carburization can lead to the degradation of mechanical properties, the combined coking and carburization can lead to catastrophic failure, such as explosions, of tubes and is a safety hazard A third problem associated with thermal cracking is materials based. The cracking tube undergoes expansion during the change in temperature of the material directly related to the coefficient of thermal expansion ($\alpha$) of the cracking tube material. However, such expansion can result in deleterious stresses forming in the metallurgical components of the reaction system due to the mismatch of the coefficient of thermal expansion between collocated and joined components of different material composition. In an extreme example, cracking tubes may expand by upwards of several percent, causing bowing, cracking, and even rupturing of the systems. This is particularly undesirable in cracking tubes using coatings or linings of materials with mismatched coefficients of thermal expansion, such as the chromium layer disposed on a cracking tube of HP-50 steel disclosed in U.S. Pat. No. 5,833,838.

A variety of solutions have been proposed for addressing the problem of coke formation and carburization in thermal cracking processes. Many of these are associated with using novel steel types, especially alloys. See for example, U.S. Pat. No. 4,762,681 to Tassen et al. and U.S. Pat. No. 4,976,932 to Maeda et al. Others utilize antifoulants, for example, U.S. Pat. No. 4,507,196 to Reed et al. which describes certain chromium antifoulants, and antifoulants which are combinations of chromium and tin; antimony and chromium; and tin, antimony, and chromium.

Methods to protect metal surfaces from carburization are also known. GB 1,604,604 to Perugini et al., discloses protecting metal surfaces against carburization by application by plasma spray deposition of a chromium layer. GB 1,149,163 to ICI, discloses methods of protecting against carburization including aluminizing and chrominizing steels containing iron, chromium, and nickel. U.S. Pat. No. 5,833,838 discloses the use of a Group VIB metal protective layer to improve the carburization and coking resistance of steels in cracking applications.

However, none of these approaches address the need to match the coefficient of thermal expansion of the various materials of the cracking tube nor doe they suggest the advantages of iron aluminide materials. Thus, it is advantageous to limit the deposition of by-products on the inside wall of the cracking tube and to inhibit the carburization of system metallurgical components. Additionally, it is advantageous that the cracking tube material exhibit excellent strength (especially in creep rupture strength) at high temperatures and oxidation resistance. Thirdly, it is desirable to have a cracking tube made from a material that exhibits a coefficient of thermal expansion that is compatible with other reaction system components.

SUMMARY OF THE INVENTION

The present invention relates to improvements in fouling resistant and corrosion resistant alloys which are useful as materials for thermal cracking or reforming reactor tubes for hydrocarbons, such as ethylene production cracking tubes and reformer tubes. More particularly, the invention relates to a lined pipe or tube having an inner lining of a fouling resistant and corrosion resistant alloy having high resistance to coking and carburization and a coefficient of thermal expansion substantially the same as the coefficient of thermal expansion of an outer body of at least a second material used in a cracking tube over the temperature range of ambient to about 1200° C.

Exemplary embodiments of the present invention are directed to providing a cracking tube with an iron aluminide first layer disposed as a lining on an inner surface of the cracking tube. The lining has high resistance to coking and carburization and a coefficient of thermal expansion substantially the same as the coefficient of thermal expansion of an outer tube.

In accordance with exemplary embodiments, an exemplary iron aluminide alloy for the lining includes 14–32 wt. % Al, 1–20 vol. %, preferably 10–14 vol. % transition metal oxides, optional $\leq 1$ wt. % Cr, and the balance including Fe. Transition metal oxides include oxides of aluminum, yttria, ceria, zirconia, or lanthanum. More particularly, transition metal oxides can be $Al_2O_3$, $Y_2O_3$, or $ZrO_3$.

A preferred iron aluminide alloy can contain B in the range of 0.003 to 0.020 wt. %, Mo in the range of 0.2 to 2.0 wt. %, Zr in the range of 0.05 to 1.0 wt. %, Ti in the range of 0.2 to 2.0 wt. %, La in the range from 0.10 to 1.0 wt. % and carbon in the range of 0.05 to 0.2 wt. %.

A method of forming a coking and carburization resistant iron aluminide cracking tube is provided wherein an alloy powder consists of 14–32 wt. % Al, 10–14 vol. % transition metal oxides, 0.003 to 0.020 wt. % B, 0.2 to 2.0 wt. % Mo, 0.05 to 1.0 wt. % Zr, 0.2 to 2.0 wt. % Ti, 0.10 to 1.0 wt. % La, 0.05 to 0.2 wt. % C, balance including Fe, and optionally $\leq 1$ wt. % Cr is formed by mechanical alloying, gas atomization, or water atomization techniques and consolidated into a cracking tube. Consolidation can be by cold isostatic pressing (CIP), hot isostatic pressing (HIP), reaction synthesis, casting techniques, spraying techniques including plasma spraying, or co-extrusion with a second material of the cracking tube. The outer layer of the cracking tube can be one of the commercial cracking tube materials used in the industry.

BRIEF DESCRIPTION OF THE DRAWING FIGURES

Figure 2:
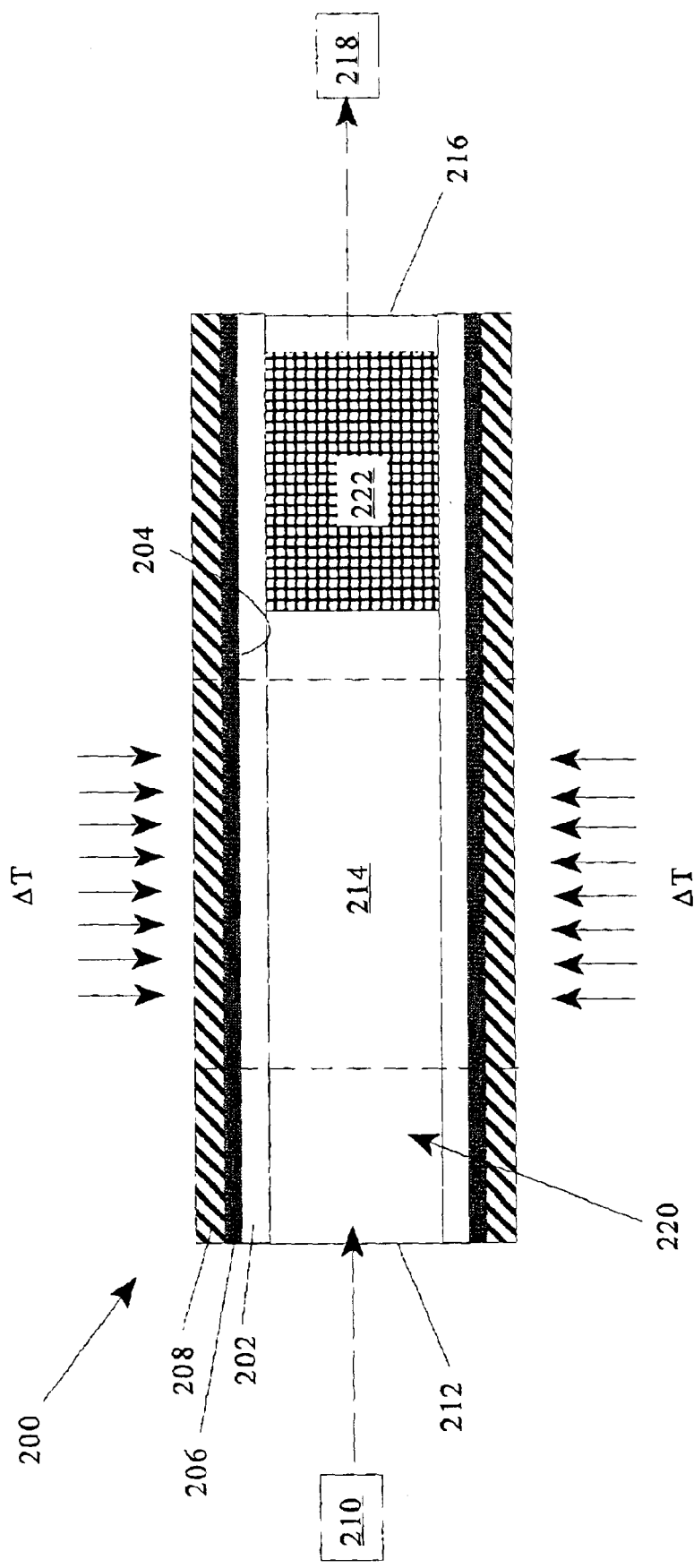

Other objects and advantages of the invention will become apparent from the following detailed description of preferred embodiments in connection with the accompanying drawings in which like numerals designate like elements and in which:

FIG. 1 is a longitudinal cross-section of a first embodiment of a cracking tube; and FIG. 2 is a longitudinal cross-section of an alternative embodiment of a cracking tube.

DETAILED DESCRIPTION OF THE PREFERRED EMBODIMENTS

FIG. 1 shows the longitudinal cross-section of an exemplary embodiment of a cracking tube 100 with a lining 102 of an iron aluminide alloy on an inner surface 104 of an outer metal layer 106. Feedstock 108 is introduced into a first end 110 of the cracking tube, flows through a thermal zone 112 of the cracking tube, and exits a second end 114 of the cracking tube as an effluent 116 containing a desired hydrocarbon product. Additionally, the interior space 118 of the cracking tube may optionally contain a catalyst 120, such as zinc oxide. In the thermal zone, temperatures can be as high as 1000 to 1150° C.

Materials selected for use in a cracking tube must perform at the elevated temperatures required, and exhibit good coking and carburization resistance. Coking is a physical process in which byproduct deposits are formed on the exposed interior surface of the cracking tube. Carburization is a chemical process in which carbides form at the grain boundaries and surface defects of the metal components. Iron aluminide is a good candidate material for a coking resistant and carburization resistant alloy. Iron aluminide, however, has an undesirably high coefficient of thermal expansion. For instance, if an iron aluminide is used as the interior protective lining of a cracking tube, the disparity of coefficients of thermal expansion between the outer tube material and the liner material can cause unequal volume expansion and create deleterious stresses in the mechanical and reaction systems. Therefore, it is desirable to provide the iron aluminide with high coking and carburization resistance as well as a coefficient of thermal expansion matched to the outer tube material of the cracking tube.

It has been determined that additions of a suitable amount of transition metal oxides, e.g., 1–20 vol. %, results in reduction in the coefficient of thermal expansion of the iron aluminide alloy. An iron aluminide alloy with at least 12 wt % aluminum, preferably 14 to 32 wt. % aluminum, at least 2 vol. % oxides, preferably 10 to 14 vol. % transition metal oxides, 0.003 to 0.020 wt. % B, 0.2 to 2.0 wt. % Mo, 0.05 to 1.0 wt. % Zr, 0.2 to 2.0 wt. % Ti, 0.10 to 1.0 wt. % La, 0.05 to 0.2 wt. % C, optional $\leq 1$ wt. % chromium, and the balance iron exhibits good coking and carburization resistance and a suitable coefficient of thermal expansion. In an exemplary embodiment, the transition metal oxides are oxides of aluminum, yttria, ceria, zirconia, or lanthanum. In a preferred exemplary embodiment, the transition metal oxides are aluminum oxide, yttrium oxide, zirconium oxide, or lanthanum oxide. Examples of other suitable iron aluminide alloys for application as corrosion resistant materials for use in the chemical industry are disclosed in commonly owned U.S. Pat. No. 5,976,458.

The use of such an alloy can reduce the undesirable processes of coking and carburization. For example, the use of an iron aluminide alloy of the present invention leads to reduced levels of these undesirable effects over time, as compared to cracking tube applications not utilizing the alloy. Also, any spalling of deposited reaction by-products can be reduced. The improved coking and carburization resistance can increase the period of time between successive decoking operations.

The alloy can be provided in any form. Several techniques can provide control over the size, shape, and surface morphology of particles and powders of the alloy. In one aspect, the powder may be formed in gas atomization or water atomization processes. Gas atomization produces irregular shaped powders and water atomization produces spherical shaped powders. The powders can be treated in a subsequent alloying or oxide and binder removal step. Examples of gas atomization and water atomization techniques are given in commonly owned U.S. patent application Ser. No. 09/660,949 filed Sep. 13, 2000, the disclosure of which is herein incorporated by reference.

In another aspect, the present invention provides nanocrystalline powders of an iron aluminide alloy for a variety of applications including materials for cracking tubes. Examples of suitable techniques for forming nanosized powders include atomizing, laser evaporation, laser vaporization, and chemical techniques. Suitable techniques are disclosed in commonly owned U.S. patent application Ser. No. 09/660,962 filed Sep. 13, 2000 and PCT/US00/29105 (Atty. Dkt. No.: 033018-015), the disclosures of which are herein incorporated by reference.

In yet another aspect, the present invention provides an exemplary alloy exhibiting coking and carburization resistance with additions of an oxide filler and an additive that, when present in suitable amounts, improves metallurgical bonding between the oxide filler and the iron aluminide. Exemplary additives include at least one refractory carbide. Examples of other suitable aluminum containing powders with oxides are disclosed in commonly owned U.S. patent application Ser. No. 09/241,377 filed Feb. 2, 1999, the disclosure of which is herein incorporated by reference. Oxide dispersion strengthened aluminum containing iron based alloys can be prepared by mechanically alloying powders comprising iron, aluminum, oxide dispersoids, and other alloying additives.

A preferred coking and carburization resistant iron aluminide cracking tube can be prepared from a powder of 14–32 wt. % aluminum, 10–14 vol. % transition metal oxides, optional $\leq 1$ wt. % chromium, and the balance iron, by mechanical alloying, gas atomization, or water atomization techniques. Powders are then consolidated into a billet or tubular shape which is extruded or rolled at high temperatures into a cracking tube. Examples of suitable powder processing techniques are disclosed in commonly owned U.S. patent application Ser. No. 09/660,949 filed Sep. 13, 2000, the disclosure of which is herein incorporated by reference. Such manufacturing methods include hot working a powder metallurgical compact.

In an exemplary method, consolidation is performed by cold isostatic pressing (CIP), hot isostatic pressing (HIP), casting techniques, thermal spraying techniques including plasma spraying, reaction synthesis, or coextrusion with a second material of the cracking tube. Coextrusion methods are utilized to extrude through specialty dies more than one material, each into a specific zone of the product cross-section. Examples of suitable reaction synthesis techniques are disclosed in commonly owned U.S. Pat. No. 6,033,623, the disclosure of which is herein incorporated by reference. Cold working and annealing techniques including thermo-mechanical powder processing are disclosed in commonly owned U.S. Pat. No. 6,030,472, the disclosure of which is herein incorporated by reference. Hot and cold isostatic processing techniques and sintering techniques are disclosed in commonly owned U.S. Pat. Nos. 5,620,651 and 5,976,458, both disclosures of which are incorporated herein by reference.

In the exemplary embodiment shown in FIG. 1, the first material and the second material of the cracking tube are co-extruded so as to consolidate the first material on the interior surface of the second material. The first material is an iron aluminide alloy with 14 to 32 wt. % aluminum, 10 to 14 vol. % transition metal oxides, including oxides of aluminum, yttria, ceria, zirconia, or lanthanum including aluminum oxide, yttrium oxide, zirconium oxide, or lanthanum oxide, 0.003 to 0.020 wt. % B, 0.2 to 2.0 wt. % Mo, 0.05 to 1.0 wt. % Zr, 0.2 to 2.0 wt. % Ti, 0.10 to 1.0 wt. % La, 0.05 to 0.2 wt. % C, optional $\leq 1$ wt. % chromium, and the balance iron. The second material is a steel, for example HP steel or INCO 803.

Alternatively, an intermediate layer can be deposited on the interior surface of the cracking tube between the iron aluminide alloy and the second material of the tube (such as INCO 803 or HP steels) as shown in FIG. 2. The intermediate layer matches the coefficients of thermal expansion of both the iron aluminide alloy and the second material and reduces internal stresses arising from thermal expansion. The iron aluminide alloy layer can be originally deposited as the desired iron aluminide alloy or as pure aluminum that upon heating diffusion reacts to form the iron aluminide alloy.

FIG. 2 shows the longitudinal cross-section of an alternative exemplary embodiment of a cracking tube 200 with a lining 202 of an iron aluminide alloy on an inner surface 204. The cracking tube 200 has an intermediate layer 206 disposed, such as by thermal spray techniques, between the lining 202 and the outer metal layer 208. Feedstock 210 is introduced into a first end 212 of the cracking tube, flows through a thermal zone 214 of the cracking tube, and exits a second end 216 of the cracking tube as an effluent 218 containing a desired hydrocarbon product. Additionally, the interior space 220 of the cracking tube may optionally wholly or partially contain a catalyst 222, such as zinc oxide. In the thermal zone, temperatures can be as high as 1000 to 1150° C.

Alternatively, the intermediate layer can have a coefficient of thermal expansion between that of the dissimilar coefficients of thermal expansion of the iron aluminide alloy and the second material. In this latter case, the intermediate layer provides a transition in the coefficient of thermal expansion between the iron aluminide alloy and the second material. The transition can mitigate the overall disparity of coefficients of thermal expansion that lead to deleterious stresses in the mechanical and reaction systems. The transition material can be the iron alumnde of the present invention with a reduced metal oxide loading, thereby increasing the disparity of coefficient of thermal expansions, or a different material having a suitable coefficient of thermal expansion.

Although the term tube and tubular has been use to describe the cracking element, it is expressly understood that any suitable geometry for the cracking element may be used. Examples of such geometries include conduits with cross-sectional sectional geometries of circles, ovals, and polyhedrons, such as rectangles. Also, the cracking element may be used in a hydrocarbon cracking operation singularly or as a plurality of such elements suitably arranged to allow the required temperature and mass flow rate for cracking to be achieved. Examples of other such arrangements include helical, spiral, and multipass arrangements.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cracking tube comprising:
   a first layer on an interior surface of the tube; and
   a second material surrounding the first layer,
   wherein the first layer is an iron aluminide alloy with transition metal oxides in an amount effective to provide a coefficient of thermal expansion substantially the same as the coefficient of thermal expansion of the second material over the temperature range of ambient to about 1000° C.

2. The cracking tube of claim 1, wherein the iron aluminide alloy is a sintered iron aluminide alloy or a composite of iron aluminide alloy.

3. The cracking tube of claim 1, wherein the second material is INCO 803 or HP steels.

4. A method of reforming a hydrocarbon feed in the cracking tube of claim 1, comprising passing of a mixture of steam and the hydrocarbon feed through the cracking tube while heating the tube to at least 800° C.

5. The cracking tube of claim 1, further comprising:
an intermediate layer disposed between the first layer and the second material,
wherein the intermediate layer has a coefficient of thermal expansion similar to the coefficients of thermal expansion of the first layer and the second material.

6. The cracking tube comprising:
a first layer on an interior surface of the tube; and
a second material surrounding the first layer,
wherein the first layer is an iron aluminide alloy,
wherein the iron aluminide alloy includes at least 2 vol. % transition metal oxides selected from oxides of aluminum, yttrium, cerium, zirconium or lanthanum.

7. The cracking tube of claim 6, wherein the iron aluminide includes at least 14 wt. % aluminum.

8. The cracking tube of claim 6, wherein the iron aluminide alloy includes an additive present in an amount which improves metallurgical bonding between the oxide filler and the iron aluminide alloy, the additive comprising at least one refractory carbide.

9. A cracking tube comprising:
a first layer on an interior surface of the tube; and
a second material surrounding the first layer,
wherein the first layer is an iron aluminide alloy, wherein the iron aluminide alloy comprises:
14–32 wt. % Al;
10–14 vol. % transition metal oxides;
0.003 to 0.020 wt. % B;
0.2 to 2.0 wt. % Mo;
0.05 to 1.0 wt. % Zr;
0.2 to 2.0 wt. % Ti;
0.10 to 1.0 wt. % La;
0.05 to 0.2 wt. % C;
balance Fe; and
optionally, $\leq 1$ wt. % Cr.

10. The cracking tube of claim 1, wherein the first layer comprises an extruded layer on the inside of the tube.

11. A cracking tube comprising:
a first layer on an interior surface of the tube; and
a second material surrounding the first layer,
wherein the first layer is an iron aluminide alloy.
wherein the alloy is in the form of a sintered nanocrystalline intermetallic powder.

12. A method of manufacturing a cracking tube comprising: a first layer on an interior surface of the tube; and a second material surrounding the first layer, wherein the first layer is an iron aluminide alloy, wherein the method comprises the steps of:
forming the first layer from a powder of 14–32 wt. % Al, 10–14 vol. % transition metal oxides, 0.003 to 0.020 wt. % B, 0.2 to 2.0 wt. % Mo, 0.05 to 1.0 wt. % Zr, 0.2 to 2.0 wt. % Ti, 0.10 to 1.0 wt. % La, 0.05 to 0.2 wt. % C, balance including Fe, and optionally $\leq 1$ wt. % Cr, the powder having been prepared by mechanical alloying, gas atomization, or water atomization techniques.

13. The method of claim 12, wherein transition metal oxides are oxides of aluminum, yttrium, cerium, zirconium or lanthanum.

14. The method of claim 13, wherein transition metal oxides are $Al_2O_3$, $Y_2O_3$, $CeO$, $Zr_2O_3$, or $LaO$.

15. The method of claim 12, wherein the first layer is formed by co-extrusion with the second material of the cracking tube, the co-extrusion carried out at a minimum of 800° C. by using a cold isostatically pressed (CIP) billet or a hot isostatically pressed (HIP) billet.

16. The method of claim 15, wherein the billet formed by cold isostatic pressing is obtained by reaction synthesis or mechanical alloying of iron aluminide with mixed oxides.

17. The method of claim 12, wherein the second material of the cracking tube is an INCO 803 steel, a HP steel, or one of the Fe-, Cr-, or Ni-based alloys with a minimum of 10 wt. % of Cr or Ni.

18. The method of claim 12, wherein the first layer is formed by thermal spraying techniques.

19. The method of claim 18, wherein thermal spraying techniques are plasma spraying or high velocity oxy-fuel spraying.

20. The method of claim 12, wherein the first layer comprises a cladding.

21. A method of reducing coking and carburization in a cracking tube having a metallurgically modified surface on the inner diameter surface thereof and the cracking tube is used in an environment in which hydrocarbon feedstock is thermally and/or catalytically converted to hydrocarbon products, comprising:
heating the cracking tube to a first temperature at which cracking of hydrocarbon feedstock occurs;
flowing hydrocarbon through the cracking tube; and
producing an effluent containing a desired hydrocarbon product,
wherein the metallurgically modified surface is an iron aluminide alloy with transition metal oxides in an amount effective to provide a coefficient of thermal expansion substantially the same as the coefficient of thermal expansion of a second material of the cracking tube over the temperature range of ambient to about 1000° C., and wherein the modified surface is substantially coke and carburization-free after a period of time in which a similar cracking tube without the metallurgically modified surface of iron aluminide alloy exhibits coking and carburization.

22. A method of reducing coking and carburization in a cracking tube having a metallurgically modified surface on the inner diameter surface thereof and the cracking tube is used in an environment in which hydrocarbon feedstock is thermally and/or catalytically converted to hydrocarbon products, comprising:
heating the cracking tube to a first temperature at which cracking of hydrocarbon feedstock occurs;
flowing hydrocarbon through the cracking tube; and
producing an effluent containing a desired hydrocarbon product,
wherein the metallurgically modified surface is an iron aluminide alloy,
wherein the iron aluminide alloy comprises:
14–32 wt. % Al;
10–14 vol. % transition metal oxides;
0.003 to 0.020 wt. % B;
0.2 to 2.0 wt. % Mo;
0.05 to 1.0 wt. % Zr;
0.2 to 2.0 wt. % Ti;
0.10 to 1.0 wt. % La;
0.05 to 0.2 wt. % C;
balance Fe; and
optionally, $\leq 1$ wt. % Cr.

23. In a process of producing hydrocarbon products from feedstock utilizing a cracking tube, the improvement comprising passing the feedstock through a cracking tube having a metallurgically modified surface of iron aluminide alloy with transition metal oxides in an amount effective to provide a coefficient of thermal expansion substantially the same as the coefficient of thermal expansion of an outer material surrounding the metallurgically modified surface of the cracking tube over the temperature range of ambient to about 1000° C., wherein the iron aluminide alloy with the transition metal oxides is disposed on an inner surface of the cracking tube such that feedstock is in fluid communication with the metallurgically modified surface.

24. In the process of claim 23, wherein the period of time between successive decoking operations is extended by at least 10 percent as compared to the time between successive decoking operations in a substantially similar cracking tube that does not have a metallurgically modified surface of iron aluminide alloy disposed on the inner surface and in fluid communication with the feedstock.

25. In a process of producing hydrocarbon products from feedstock utilizing a cracking tube, the improvement comprising passing the feedstock through a cracking tube having a metallurgically modified surface of iron aluminide alloy disposed on an inner surface of the cracking tube such that feedstock is in fluid communication with the metallurgically modified surface, wherein the iron aluminide alloy comprises:

14–32 wt. % Al;
10–14 vol. % transition metal oxides;
0.003 to 0.020 wt. % B;
0.2 to 2.0 wt. % Mo;
0.05 to 1.0 wt. % Zr;
0.2 to 2.0 wt. % Ti;
0.10 to 1.0 wt. % La;
0.05 to 0.2 wt. % C;
balance Fe; and
optionally, $\leq$1 wt. % Cr.

26. In a cracking tube, the improvement comprising:
a metallurgically modified surface of iron aluminide alloy with transition metal oxides disposed on the inner surface of the cracking tube,
wherein the feedstock is in fluid communication with the metallurgically modified surface and wherein the coefficient of thermal expansion of the iron aluminide alloy is lowered by the transition metal oxides to be substantially the same as the coefficient of thermal expansion of a second material of the cracking tube over the temperature range of ambient to about 1000° C., the second material being an outer material for the cracking tube.

27. In the cracking tube of claim 26, the improvement further comprising:
an intermediate layer disposed between the iron aluminide alloy and the second material, the intermediate layer having a coefficient of thermal expansion similar to that of the iron aluminide alloy with the transition metal oxides and the second material.

28. In a cracking tube, the improvement comprising:
a metallurgically modified surface of iron aluminide alloy disposed on an inner surface of the cracking tube, wherein the iron aluminide alloy comprises:

14–32 wt. % Al;
10–14 vol. % transition metal oxides;
0.003 to 0.020 wt. % B;
0.2 to 2.0 wt. % Mo;
0.05 to 1.0 wt. % Zr;
0.2 to 2.0 wt. % Ti;
0.10 to 1.0 wt. % La;
0.05 to 0.2 wt. % C;
balance Fe; and
optionally, $\leq$1 wt. % Cr.

* * * * *